(12) United States Patent
Misenhelder et al.

(10) Patent No.: US 7,712,544 B1
(45) Date of Patent: May 11, 2010

(54) TOOL BAR WITH FORWARD FOLDING WINGS

(76) Inventors: John G. Misenhelder, 5571 S. Alger, Ithaca, MI (US) 48847; Douglas Dean Harkness, 245 S. Winans Rd., Ithaca, MI (US) 48847

(*) Notice: Subject to any disclaimer, the term of this patent is extended or adjusted under 35 U.S.C. 154(b) by 0 days.

(21) Appl. No.: 12/371,897

(22) Filed: Feb. 16, 2009

Related U.S. Application Data

(63) Continuation of application No. 11/716,184, filed on Mar. 9, 2007, now abandoned.

(51) Int. Cl.
*A01B 49/00* (2006.01)
(52) U.S. Cl. ........................... 172/311; 172/456
(58) Field of Classification Search .............. 172/311, 172/448, 456, 624.5, 626, 679, 677, 680, 172/683, 773, 775, 776; 37/234, 468; 56/14.9, 56/15.6, 15.9
See application file for complete search history.

(56) References Cited

U.S. PATENT DOCUMENTS

| | | | | |
|---|---|---|---|---|
| 2,226,586 A * | 12/1940 | Seaholm | ...................... | 172/240 |
| 3,493,247 A * | 2/1970 | Hornung et al. | ............. | 172/456 |
| 3,698,488 A * | 10/1972 | Yoder et al. | ................. | 172/311 |
| 4,034,623 A * | 7/1977 | Boone et al. | .................. | 74/522 |
| 4,211,287 A * | 7/1980 | Garrison | ...................... | 172/311 |
| 4,327,932 A * | 5/1982 | Anderson | .................... | 172/311 |
| 5,113,956 A * | 5/1992 | Friesen et al. | ................ | 172/311 |
| 5,199,252 A * | 4/1993 | Peeters | ........................ | 56/377 |
| 5,488,996 A * | 2/1996 | Barry et al. | .................. | 172/311 |
| 5,647,440 A * | 7/1997 | Barry et al. | .................. | 172/311 |
| 5,685,135 A * | 11/1997 | Menichetti | ................... | 56/365 |
| 5,787,988 A * | 8/1998 | Harlan et al. | ............... | 172/311 |
| 6,293,352 B1 * | 9/2001 | Hundeby et al. | ............ | 172/456 |
| 6,702,035 B1 * | 3/2004 | Friesen | ........................ | 172/311 |

* cited by examiner

*Primary Examiner*—Robert E Pezzuto
*Assistant Examiner*—Matthew D Troutman
(74) *Attorney, Agent, or Firm*—Robert L. Farris; Farris Law, P.C.

(57) ABSTRACT

The forward folding tool bar for grain planters includes a main frame. Left and right pivot frames are pivotally attached to the main frame for pivotal movement about vertical axes. Wing assemblies are pivotally connected to the pivot frames for pivotal movement about horizontal fore and aft axes. A tongue assembly includes a rear tube fixed to the main frame. A forward tube is telescopically received in the rear tube. A mast is fixed to the forward end of the forward tube. A pantographic linkage includes draft links pivotally attached to the mast and a hitch member. A hydraulic cylinder raises and lowers the mast. The draft links include slots that receive bar portions attached to the rear tube, in a lowered working position. Telescopic tension connector links attached to the mast and the wings prevent pivotal movement of the pivot frames when telescopic movement is blocked.

2 Claims, 9 Drawing Sheets

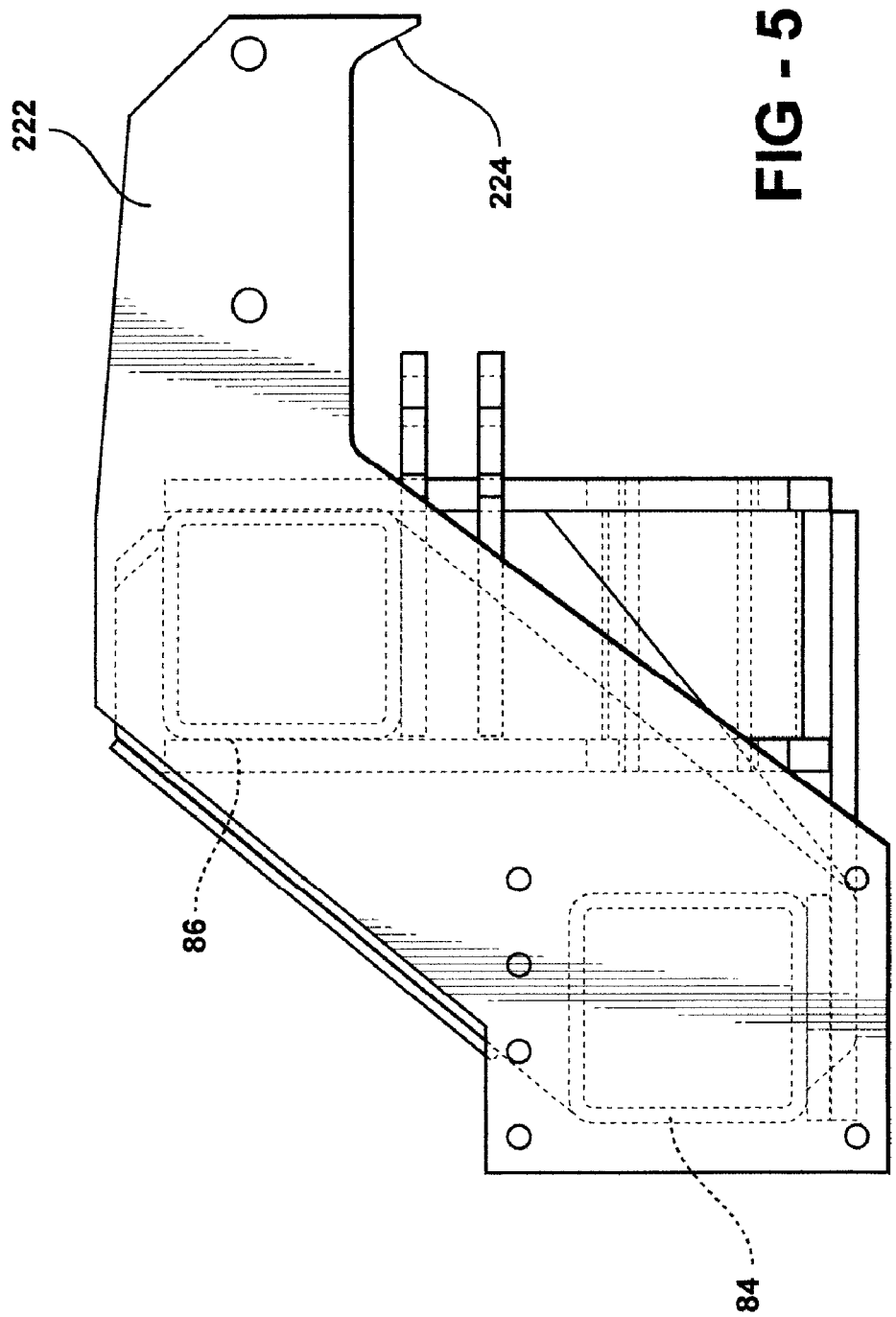

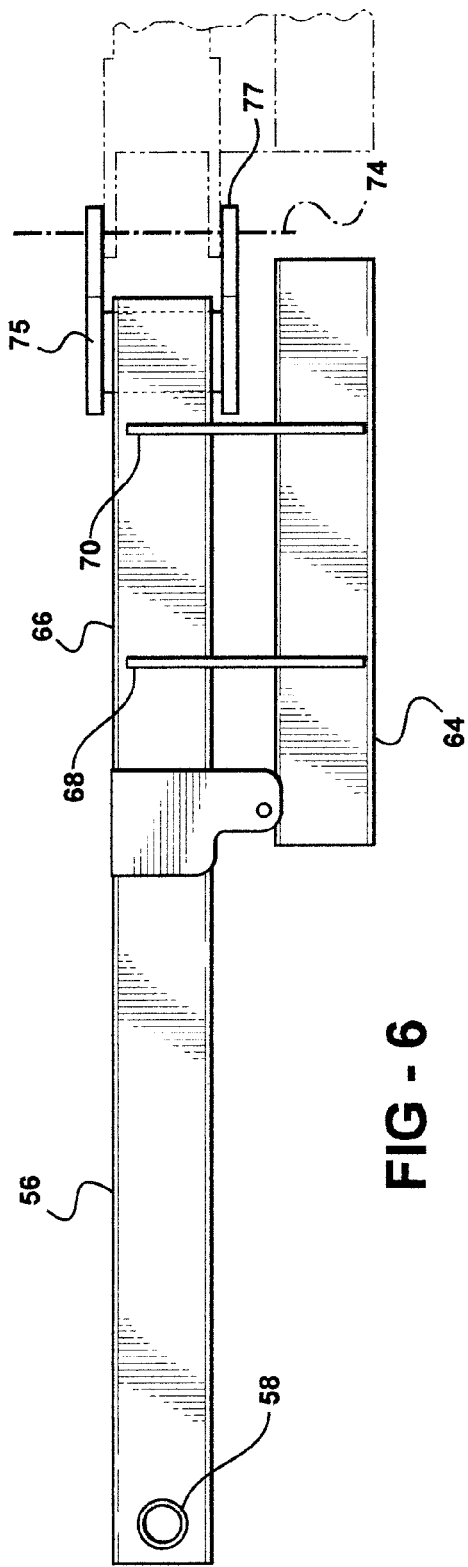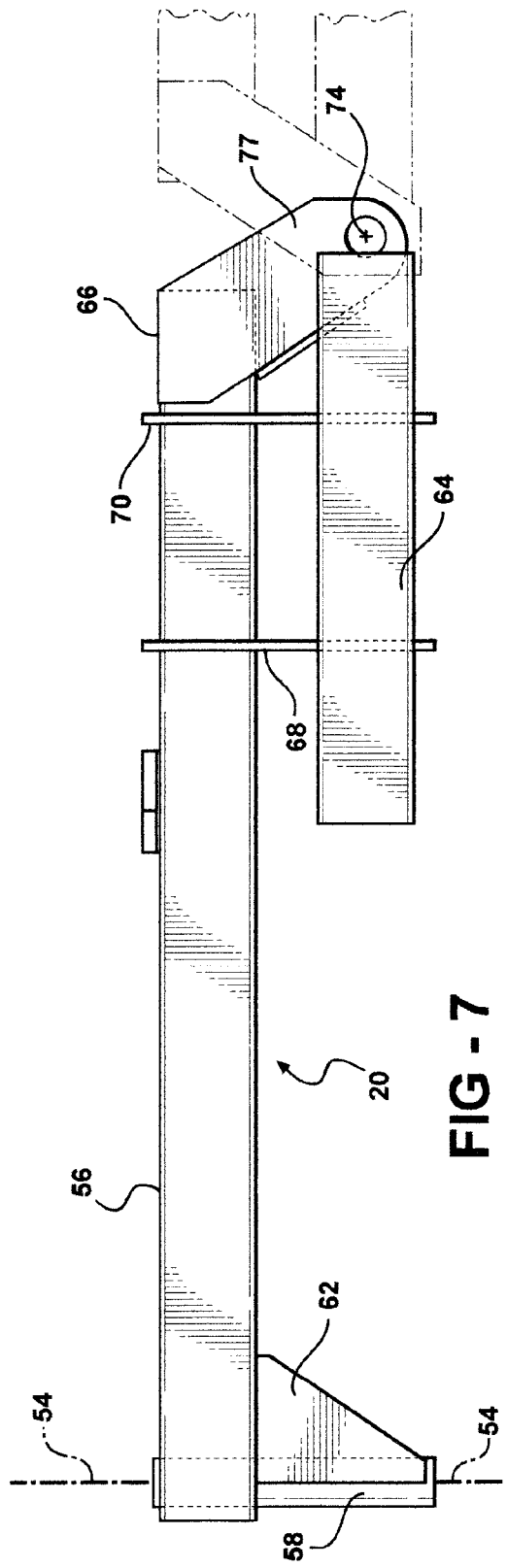

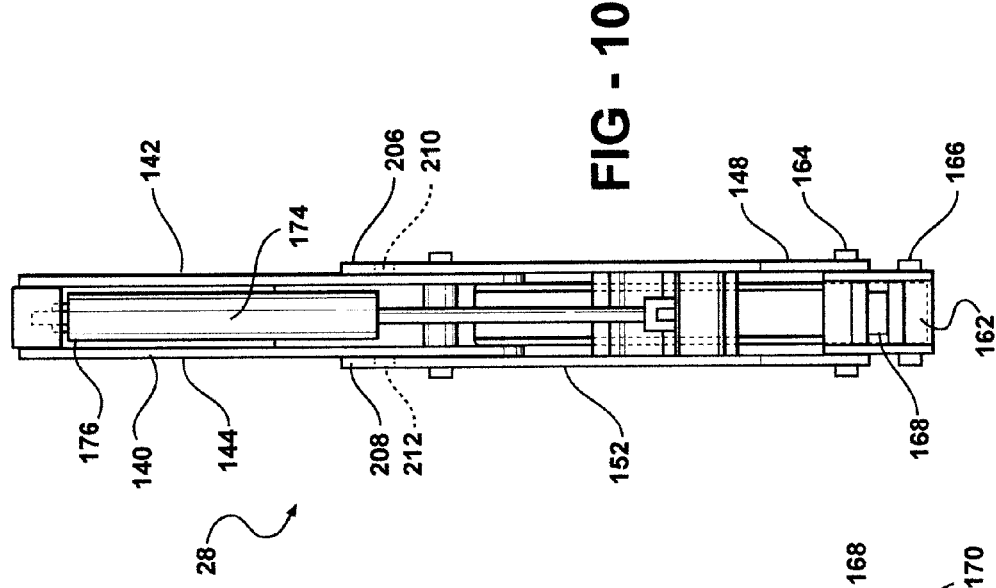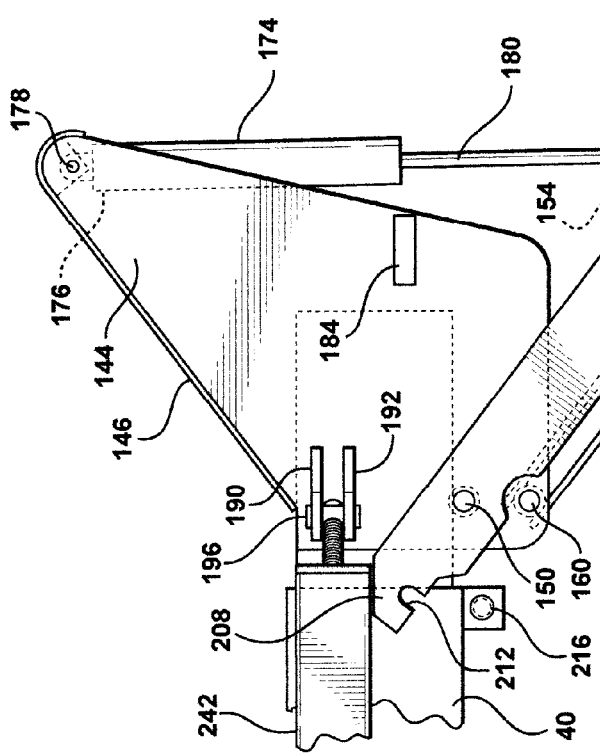

TOOL BAR WITH FORWARD FOLDING WINGS

CROSS REFERENCE TO RELATED APPLICATION

This application claims the benefit of the filing date of U.S. Provisional Application No. 60/781,425, titled TOOL BAR WITH FORWARD FOLDING WINGS filed Mar. 10, 2006 and a continuation of U.S. application Ser. No. 11/716,184 filed Mar. 9, 2007 now abandoned.

TECHNICAL FIELD

The tool bar carries tillage and planting assemblies, has wing sections that pivot up and down relative to a center section to follow the contour of a field and that pivot forwardly relative to the center section for transport between fields on roads.

BACKGROUND OF THE INVENTION

Tool bars are pulled by tractors to cultivate soil, plant seeds in the ground, and apply fertilizer, herbicides, insecticides, and fungicides. To improve efficiency, reduce cost per acre, and reduce soil compaction, the width of an area planted during each pass through a field has been increased. Tool bars are available that can plant thirty-six rows of corn with a space of thirty inches between rows. The tool bar must have a length of about ninety feet to carry thirty-six planter units with thirty inch row spacing. A tool bar that is capable of carrying 36 planter units and planting thirty-six rows of corn simultaneously with thirty inches between rows must have some flexibility to follow the field surface contour even when planting in fields that have been leveled by laser controlled earth movers. Each planter unit is attached to a tool bar by a linkage that permits the unit to float up and down relative to the tool bar. A depth control system, that is part of each planter unit, controls the depth that seeds are deposited below the surface of soil. Seeds are ideally planted at a uniform depth so that they germinate and emerge at about the same time. The total depth depends on factors such as soil type, moisture content, soil temperature and a farmer's educated assessment based on years of experience. It is generally considered desirable to position the seeds that are the deepest within one inch of seeds that are closest to the surface. If the tool bar is too high, it will tend to lift a planter unit. If the tool bar is too low, it will tend to force a planter unit downward and increase seed depth.

Seed depth is more uniform if a tool bar has a center section and wing sections pivotally attached to the center section. The center section is supported by gauge wheels that are spaced outward from the center of the center section. The wings have inboard ends that are pivotally attached to adjacent end of the center section for pivotal movement about a horizontal fore and aft extending axis. Each wing section has a gauge wheel or gauge wheels that are mounted on the wing section outboard portion. The horizontal fore and aft extending axis should be as low as possible to minimize the change in row spacing between a planter unit on an outboard end of the center section and the planter unit on an inboard end of the wing section.

A tool bar for simultaneously planting thirty-six crop rows with thirty inch row spacing will typically have twelve planter units on the center section, twelve planter units on the left wing, and twelve planter units on the right wing. The center section of the tool bar with twelve planter units set to provide thirty inch spacing between rows of plants is too wide to move on some rural roads.

The width of the center section is reduced by attaching two planter units, on the left end of the center section, to the left wing and attaching two planter units, on the right end of the center section to the right wing when folding the wings forward to transport on rural roads. The eight planter units that remain with center section can be moved short distances on rural roads.

A telescopic tongue includes a rear portion that is attached to the center section and a forward portion that carries a hitch assembly. During planting or other operations in a field, the length of the telescopic tongue is reduced to make it easier to change the direction of forward movement. When the wings are folded to the front for movement between fields or into a storage building for example, the length of the telescopic tongue is increased to make room for the outboard ends of the wing sections. In the folded transport position, the wing sections are supported by the telescopic tongue.

A towing tractor exerts tension forces on the telescopic tongue when pulling the tool bar in the field as well as when pulling the tool bar in a forward folded transport position. The pulling tension when the telescopic tongue is extended is transmitted from a front tongue beam to a rear tongue beam by left and right tension connector links that limit the maximum length of the telescopic tongue. The tension connector links provide a longer unit than necessary when the wings are folded for movement between fields. Locks of various descriptions have been employed to lock the telescopic tongue in a retracted position during tilling and planting operations. Some of the locks have been too weak. Other locks have employed complicated linkages that require close inspection to insure that the lock is engaged. Hydraulically operated locks employing a dedicated hydraulic circuit have also been used. The hydraulic cylinder may require an additional hydraulic control valve. The number of control valves and hydraulic couplers on tractors are limited. The tools attached to a tool bar may require more hydraulic circuits than some tractors have.

SUMMARY OF THE INVENTION

The tool bar, with forward folding wings has a main frame assembly. A telescopic tongue assembly includes a rear tube secured to the main frame assembly and a forward tube telescopically received in the rear tube. A transverse horizontal tool mounting tube is secured to the main frame assembly. A left pivot frame is pivotally attached to the main frame assembly for pivotal movement about a left vertical axis. A right pivot frame assembly is pivotally attached to the main frame assembly for pivotal movement about a right vertical axis.

A left wing assembly is pivotally attached to the left pivot frame assembly, for pivotal movement about a left fore and aft pivot axis. The left wing assembly includes a left tool mounting tube. A right wing assembly is pivotally attached to the right pivot frame assembly for pivotal movement about a right fore and aft pivot axis. The right wing assembly includes a right tool mounting tube.

At least two gauge wheels are attached to and support the main frame assembly. At least one gauge wheel is attached to and supports the left wing assembly. At least one right gauge wheel is attached to and supports the right wing assembly.

A hitch assembly includes a mast fixed to a forward end of the forward tube of the telescopic tongue assembly. At least one draft link is pivotally attached to the mast and to a hitch block. A parallel draft link is pivotally attached to the mast and to the hitch block. The parallel draft link is parallel to the at least one draft link and cooperates with the mast, the at least one draft link and the hitch block to form a pantographic linkage. A hydraulic cylinder is attached to the mast and to the at least one draft link. The hydraulic cylinder is operable to lift and lower the mast between a raised transport position and a lowered working position. A draft link extension on the at least one draft link extends to the rear of the pivot attachment to the mast and includes a slot that receives a bar on the rear tube when the mast is in a working position. The slot in the draft link extension anchors the hitch assembly to the rear tube of the telescopic tongue assembly when the bar is received in the slot.

A left tension connector includes a rear tube that is pivotally connected to the left pivot frame assembly and the left wing assembly. A front tube, of the left tension connector, is telescopically attached to the rear tube and pivotally attached to the mast. A lock locks the left tension member rear tube to the front tube, when in a working position to minimize pivotal movement of the left pivot frame about the left vertical axis. A right tension connector includes a rear tube that is pivotally connected to the right pivot frame assembly and the right wing assembly. A front tube, of the right tension connector is telescopically attached to the rear tube and pivotally attached to the mast. A lock locks the right tension member rear tube to the front tube, when in a working position to minimize pivotal movement of the right pivot frame about the right vertical axis.

BRIEF DESCRIPTION OF DRAWINGS

These and other objects, features and advantages will be apparent in view of the following detailed description of the presently preferred embodiments and best mode, appended claims, and accompanying drawings, in which:

FIG. 5 is an enlarged end elevational view of the right wing assembly;

FIG. 6 is an enlarged top plan view of the right pivot frame;

FIG. 7 is a rear elevational view of the right pivot frame shown in FIG. 6;

FIG. 9 is a side elevational view of the hitch assembly and the telescopic tongue with parts broken away;

FIG. 10 is an enlarged front elevational view of the hitch assembly; and

DETAILED DESCRIPTION OF THE PREFERRED EMBODIMENTS

Figure 1:
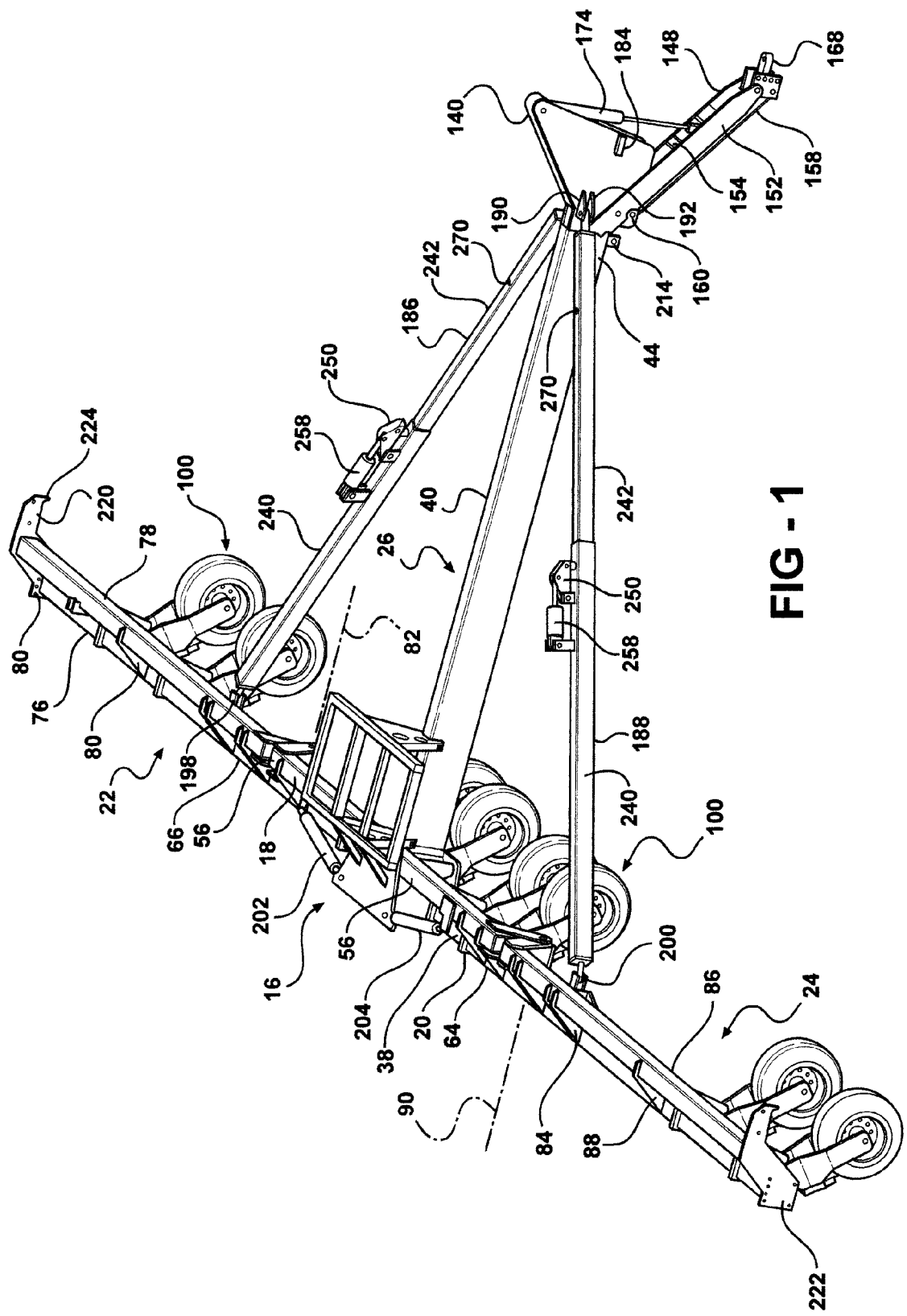
FIG. 1 is a perspective view of the tool bar, in an extended and raised position and without planter units or other attachments.

The tool bar 10 with forward folding wings 12 and 14 includes a main frame assembly 16 a left pivot frame assembly 18 a right pivot frame assembly 20, a left wing assembly 22 and a right wing assembly 24, a telescopic tongue assembly 26, a hitch assembly 28, and a plurality of support wheel assemblies 30. The mainframe assembly 16 includes a top plate 32 and a bottom plate 34. A plurality of vertical spacer plates 36 are welded to the top plate 32 and the bottom plate 34 and hold the top plate and the bottom plate in spaced apart and parallel positions relative to each other. A transverse horizontal tool mounting tube 38 is welded to the space plates 36.

The telescopic tongue assembly 26 includes a rear tube 40 that is fixed to the top plate 32 and the bottom plate 34 of the mainframe assembly 16 and is an integral part of the mainframe assembly. The tool mounting tube 38 is integral with the main frame 16 and is transverse to the rear tube 40. A forward tube 42 is telescopically received in a forward end 44 of the rear tube 40. The hitch assembly 28 is fixed to a forward end 46 of the forward tube 42.

A left pivot frame 18 is pivotally attached to the mainframe assembly 26 by a pivot bar 48 for pivotal movement about a left vertical axis 50. A right pivot frame 20 is pivotally attached to the mainframe assembly 16 by a pivot bar 52 for pivotal movement about a right vertical axis 54. The left pivot frame 18 is a mirror image of right pivot frame 20. The right pivot frame 20 only is therefore described herein. The right pivot frame 20 includes a horizontal square tube 56. A vertical pivot tube 58 is welded to an inboard end 60 of the square tube 56. A pair of gussets 62 are welded to the vertical pivot tube 58 and to the bottom of the square tube 56. The pivot bar 52 passes through the pivot tube 58 to pivotally attach the right pivot frame 20 to the main frame 16. A tool mounting tube 64 is mounted on an outboard end 66 of the square tube 56 by vertical plates 68 and 70. These plates 68 and 70 support the tool mounting tube 64 below and to the rear of the square tube 56 and in axial alignment with the transverse horizontal tool mounting tube 38 when the right wing assembly 24 is extending transversely to the right of the telescopic tongue 26. A tool mounting tube 72 on the left pivot frame 18 is in axial alignment with the tool mounting tube 64 and the tool mounting tube 38 fixed to the mainframe assembly 16. A wing float pivot axis 74 passes through two spaced apart plates 75 and 77 that are welded to the outboard end 66 of the square tube 56. The axis 74 intersects and is transverse to a long axis through the center of the tool mounting tubes 64 and 72.

The left wing assembly 22 includes a tool mounting tube 76 and a left wing frame tube 78. A plurality of vertical plates 80 are welded to the tool mounting tube 76 and the frame tube 78. The left frame tube 78 is in axial alignment with the left horizontal square tube 56 of the left pivot frame 18 when the left wing assembly 22 and the left pivot frame are both horizontal. The left wing assembly 22 pivots up and down about the fore and aft pivot axis 82 as the tool bar 10 moves across unleveled fields.

The right wing assembly 24 includes a tool mounting tube 84 and a right wing frame tube 86. A plurality of vertical plates 88 are welded to the tool mounting tube 84 and the right frame tube 86. The right frame tube 86 is in axial alignment with the right horizontal square tube 56 of the right pivot frame 20 when the right wing assembly 24 and the right pivot frame are both horizontal. The right wing assembly 24 pivots up and down about the fore and aft pivot axis 90 as the tool bar 10 moves across unleveled fields.

Figure 4:
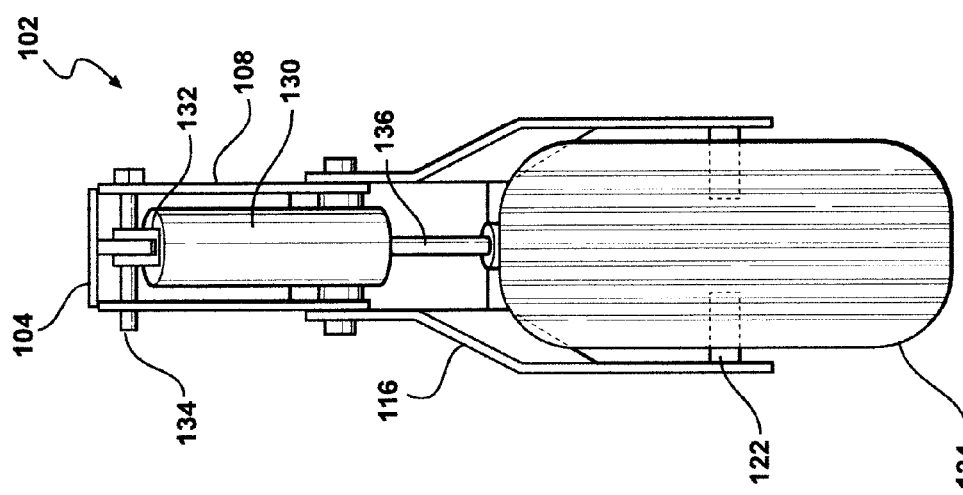
FIG. 4 is a front elevational view of the wheel support assembly shown in FIG. 3.
Figure 3:
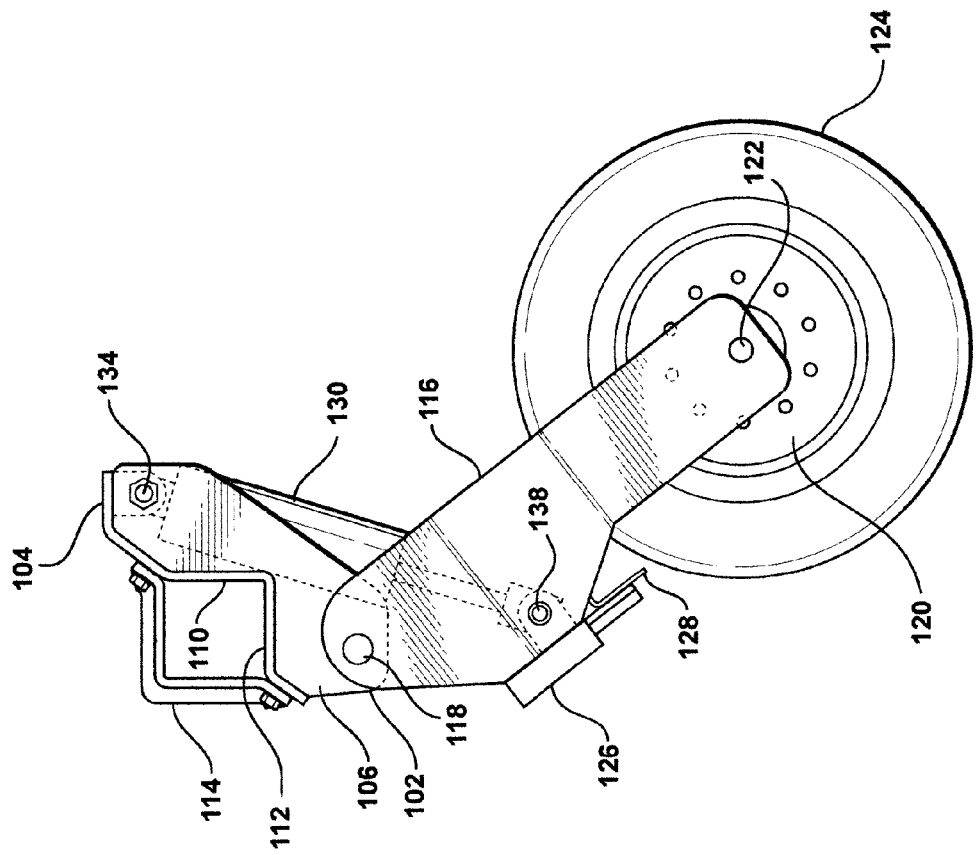
FIG. 3 is an enlarged side elevational view of a tool bar wheel support assembly.
Figure 8:
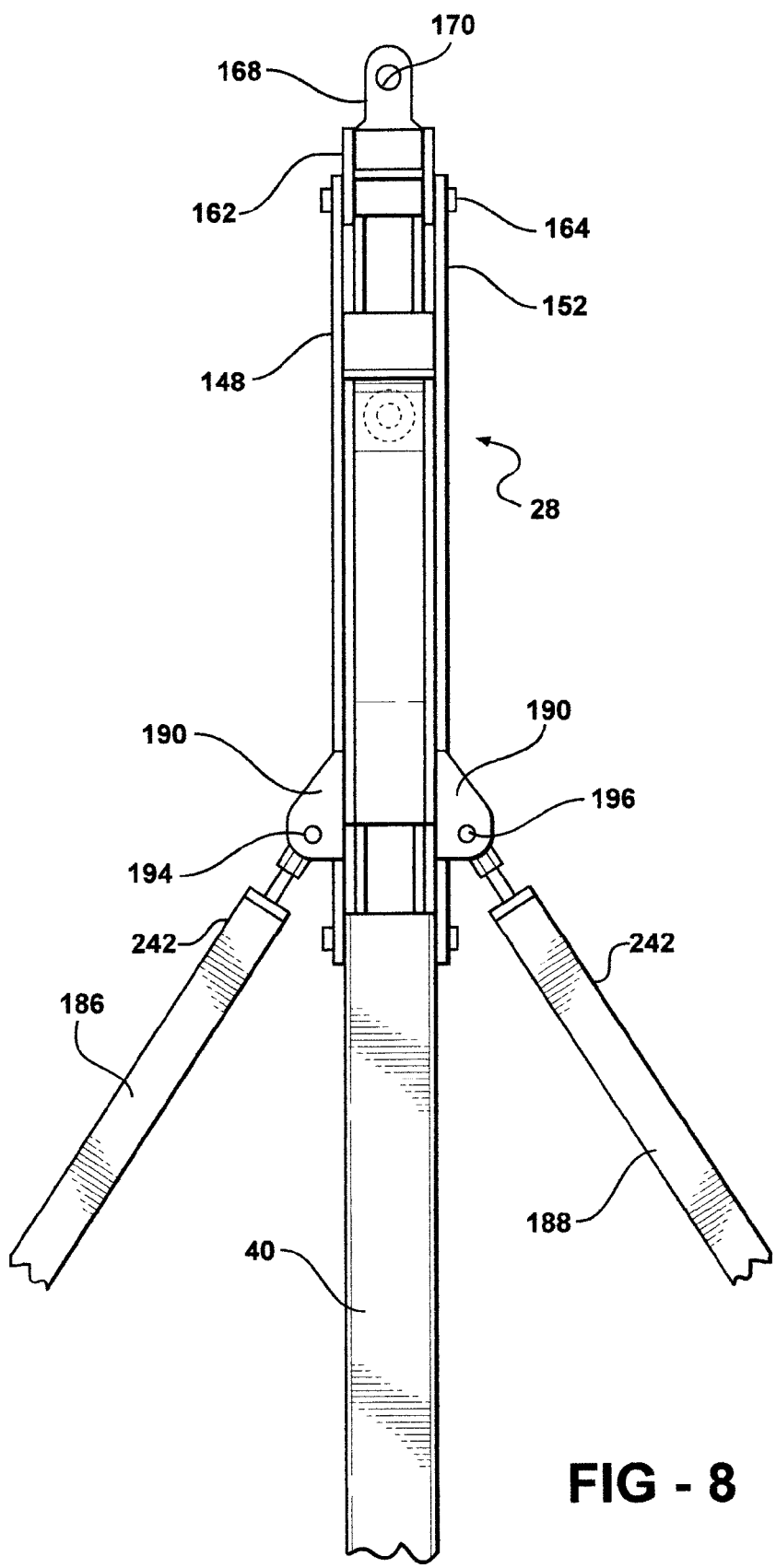
FIG. 8 is a bottom plan view of the forward portion of the telescopic tongue and the hitch assembly with parts broken away.
Figure 11A:
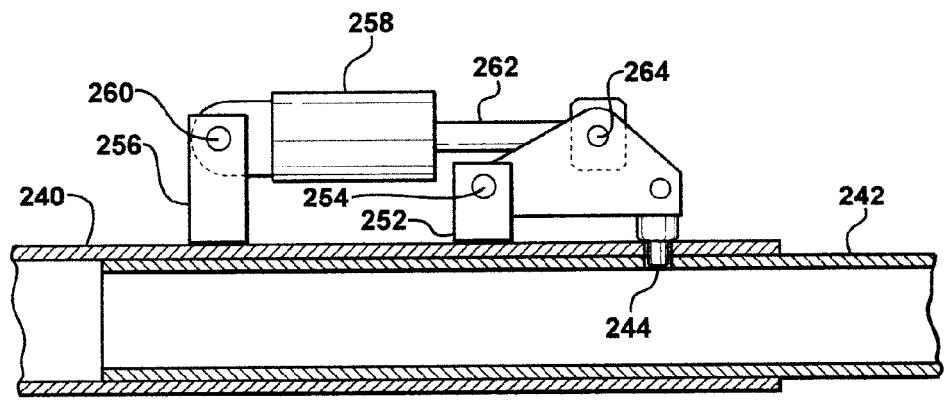
FIG. 11A is an enlarged sectional view of a tension connector link telescopic connection in a locked condition and parts broken away.
Figure 11B:
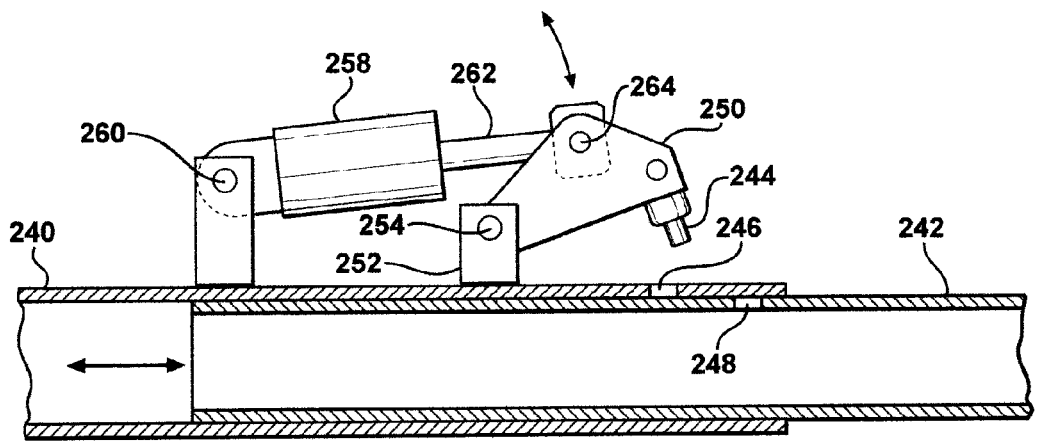
FIG. 11B is a sectional view similar to FIG. 11A with the telescopic connection unlocked and parts broken away.

Four gauge wheel assemblies 100 are mounted on the center tool mounting tube 38. Two-gauge wheels 100 are mounting on the left tool mounting tube 84. Two additional gauge wheel assemblies 100 are mounted on the right tool mounting tube 84. All of the gauge wheel assemblies are identical. Only one gauge wheel assembly 100 is therefore described. The gauge wheel assembly as shown in FIGS. 3 and 4 has a mounting bracket 102 with a top plate 104 and two spaced apart vertical side plates 106 and 108. The top plate 104 includes a vertical wall portion 110 that engages a front wall of a tool mounting tube and a horizontal wall 112 that engages the bottom wall of a tool mounting tube. A cap 114 is clamped to the top plate 104 by bolts to fix the position of the mounting bracket 102 along the length of one of the tool mounting tubes. A yoke 116 is pivotally attached to the mounting bracket 102 by a pivot pin 118. A wheel 120 is journaled by bearing on a horizontal shaft 122. A pneumatic tire 124 is mounted on the wheel 120. A scraper assembly 126 is attached to the yoke 116. A plate member 128 of the scraper assembly 126 is positioned adjacent to the tire 124 and scrapes mud from the tire as the tool bar 10 advances over the surface of a field. A hydraulic cylinder 130 has a head end 132 secured to the mounting bracket 102 by a pin 134. The rod 136 on the cylinder 130 is attached to the yoke 116 by a pin 138. Extension of the hydraulic cylinder 130 raises the mounting bracket 102 and the tool mounting tubes attached to the mounting bracket. Retraction of the hydraulic cylinder 130 lowers the mounting bracket 102 or raises the tire 124.

The hitch assembly 28 includes a mast 140 attached to the forward end 46 of the forward tube 42 of the telescopic tongue assembly 26. The mast 140 includes two spaced apart vertical mast plates 142 and 144. The mast plate 142 is attached to the left side of the forward tube 42. The mast plate 144 is attached to the right side of the forward tube 42. A mast cover plate 146 is welded to the upwardly facing surfaces of the mast plates 142 and 144. A left side upper draft link 148 is pivotally attached to the outside surface of the mast plate 142 by a pivot pin 150. A right side upper draft link 152 is pivotally attached to the outside surface of the mast plate 144 by the pivot pin 150. Spacer tubes 154 and 156 are welded to facing surfaces of the draft links 148 and 152 well forward of the pivot pin 150. A lower draft link 158 is parallel to the upper draft links 148 and 152. The rear end of the lower draft link 158 is between the mast plates 142 and 144 and is pivotally attached to the mast 140 by a lower pivot pin 160. The lower pivot pin 160 is in vertical alignment with the pivot pin 150 for the upper draft links 148 and 152 and below the upper draft link pivot pin. A hitch block 162 is pivotally connected to the forward ends of the upper draft links by an upper pin 164. The hitch block 162 is also pivotally attached to the lower draft link 158 by a pin 166. The upper pin 164 is vertically spaced from and directly above the pin 166. The four pins 150, 160, 164 and 166 together with the mast plates 142 and 144, the links 148 and 152, and the hitch block 162 from a pantographic linkage. A hitch member 168, with a hitch pin-receiving bore 170 is secured to the hitch block 162 by two bolts that pass through two of four bores 172 through the hitch block 162. The four bores 172 permit the hitch member 168 to be located in at least three different vertical positions relative to the hitch block 162. The position of the hitch member 168 in the hitch block 162 is selected to position the hitch member at substantially the same height as the height of the hitch on the tractor that pulls the tool bar when the tongue assembly 26 is horizontal.

A hydraulic cylinder 174 has a head end 176 that is pivotally attached to an upper portion of the mast 140 by a mast pivot pin 178. The rod 180 of the hydraulic cylinder 174 is pivotally attached to the upper draft links 148 and 152 by a pivot pin 182. Extension of the hitch hydraulic cylinder 174 lifts the front of the telescopic tongue assembly 26 to a transport position. Retraction of the hydraulic cylinder 174 lowers the front of the telescopic tongue 26 to a working position with the upper draft links 148 and 152 in engagement with stop blocks 184 fixed on the mast 140. The hitch pin-receiving bore 170 is held in a vertical position by the pantographic linkage during extension and retraction of the hydraulic cylinder 174.

Tension connector links 186 and 188 have their forward ends connected to upper ears 190 extending from the sides of the mast 140 and lower ears 192 extending from the sides of the mast. The connections between the connector link 186 and the mast 140 includes a vertical pivot pin 194. The connection between the connector link 188 and the mast 140 includes a vertical pivot pin 196. The rear end of the left connector link 186 is pivotally connected to the left wing frame tube 78 by a vertical connector pin 198. The pin 198 is substantially mid way between the outboard end of the frame tube 78 and the pivot bar 48. The rear end of the right connector link 188 is pivotally connected to the right wing frame tube 86 by a vertical connector pin 200. The pin 200 is substantially mid way between the outboard end of the frame tube 86 and the pivot bar 52.

The tension connector links 186 and 188 are interchangeable between the left side and the right side of the tool bar 10. The function of the tension connector links 186 and 188 is to transfer draft forces from a tractor and hitch member 168 directly to the left wing frame tube 78 and the right wing frame tube 86 thereby reducing forces on the main frame assembly 16 and reducing bending loads on the left wing frame tube 78, the right wing frame tube 86 as well as other structural members. Forward folding tool bars currently in production have tension connector links with a fixed operating length. They have short length adjustment screws to assist in link connection to a tool bar 10. Fixed operating length tension connector links results in the requirement of a long telescopic forward tube 42 to slide out of the rear tube 40 until the tension connector links 186 and 188 are substantially parallel with the forward tube. This requirement makes the transport length of the tool bar in the folded transport position longer than necessary. A long transport length implement is difficult to move around a corner.

Figure 1A:
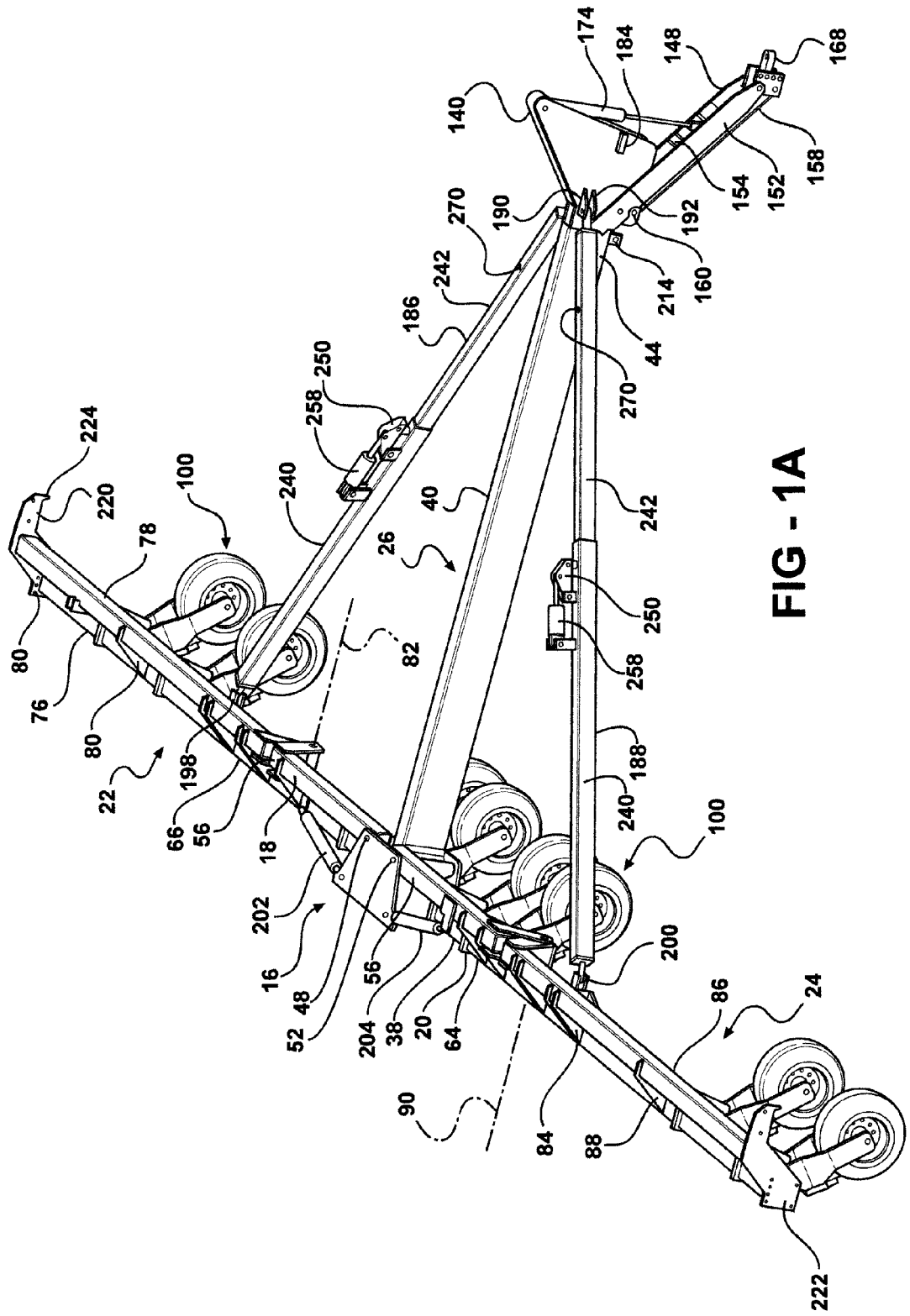
FIG. 1A is a perspective view similar to FIG. 1 with a cargo support removed from the rear of the main frame assembly.
Figure 2:
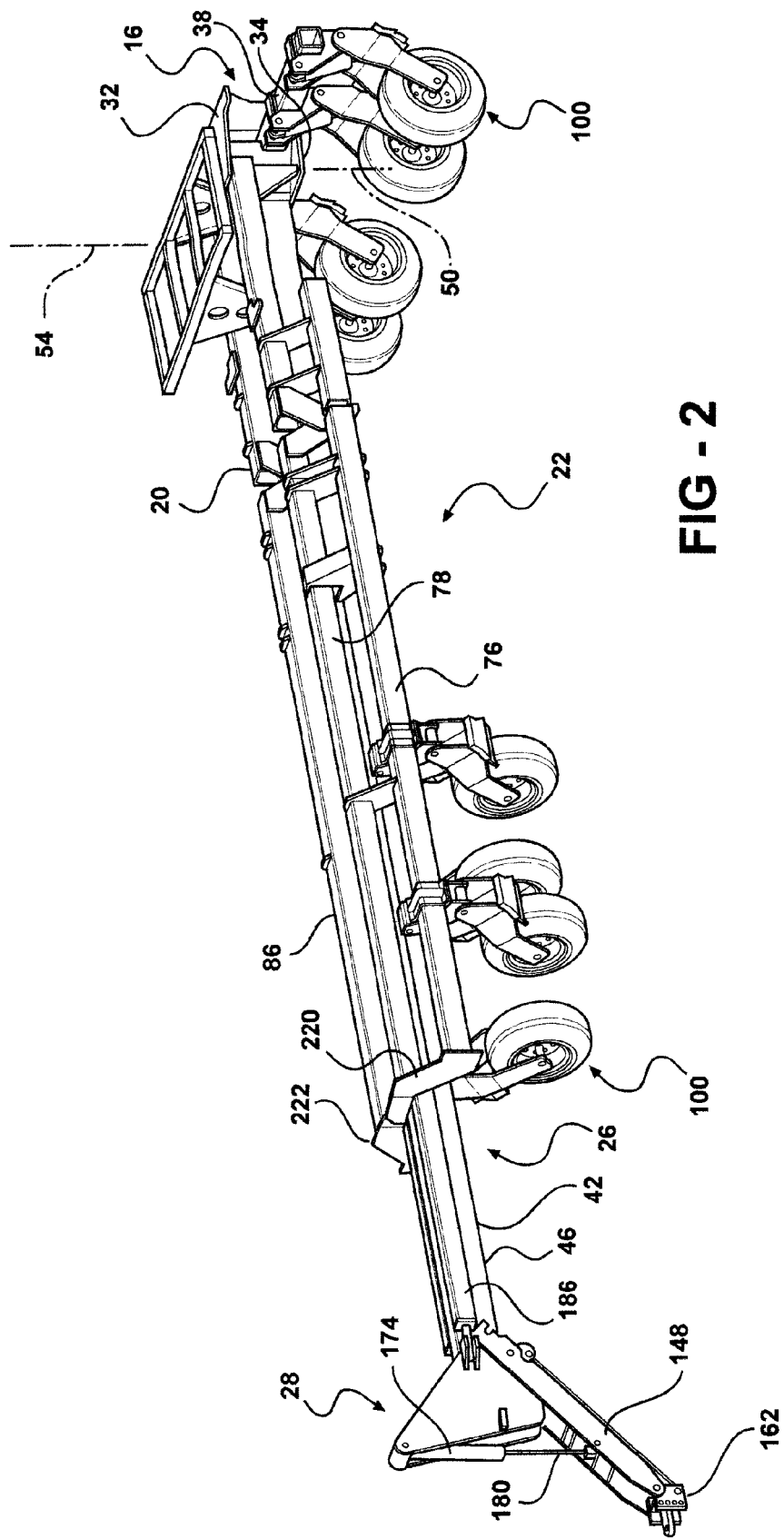
FIG. 2 is a perspective view of the tool bar in a folded transport position.

The tension connector links 186 and 188, shown in FIGS. 1, 1A, 11A and 11B, include a large rear tube portion 240 and a smaller front tube portion 242 that is telescopically received in the rear tube portion. The tubes 240 and 242, as shown, have a square or rectangular cross-section. The total length of a tubular tension connector link assembly 186 and 188 decreases when the tool bar 10 is folded from the working position shown in FIG. 1 to the folded transport position shown in FIG. 2. For the tension connector links 186 and 188 to transmit draft forces, their length must be fixed when the wing assemblies 20 and 22 are unfolded as shown in FIGS. 1 and 1A. The length of the tension connector links 186 and 188 is fixed by a lock pin 244 that passes through an aperture 246 in the rear tube portion 240 and into an aperture 248 in the front tube portion 242. The lock pin 244 is fixed to a lock channel shaped block member 250. The lock channel shaped block member 250 is pivotally attached to a support yoke 252 by a lock pivot pin 254. The support yoke is attached to an outside wall of the rear tube portion 240. A cylinder support 256 is also attached to the rear tube portion 240. A double acting hydraulic cylinder 258 has its head end pivotally attached to the cylinder support 256 by a cylinder pin 260. The cylinder rod 262 is pivotally connected to the block member 250 by a rod pin 264. The hydraulic cylinder 258 is extended to move the lock pin 244 through the aperture 246 and into the aperture 248. The hydraulic cylinder 258 is retracted to remove the lock pin 244 from the apertures and free the front tube portion 242 for telescopic movement into the rear tube portion 240.

A cable is connected to the rear of the rear tube 40 of the hitch assembly 28 and extends forward inside the rear tube 40. The forward end of the cable is anchored to the forward tube 42. This cable is a stop that limits movement of the forward tube 42 completely out of the rear tube 40. The cable also prevents the front tube portions 242 of the tension connector links 186 and 188 from sliding completely out of the rear tube portion 240.

Hydraulic fluid is supplied to the double acting hydraulic cylinders 258 through flexible lines that extend along the rear tube portions 240 to the respective wing assemblies 22 and 24 where the lines are connected to the tool bar hydraulic system. The hydraulic cylinders 258 could also be connected directly to a tractor hydraulic system. When the double acting hydraulic cylinders are attached directly to the tractor, the tension links 186 and 188 are reversed so that the rear tube portions 240 are connected directly to the mast 140 by vertical pivot pin 196 or 198.

A left wing folding cylinder 202 is pivotally connected to the top plate 32 of the mainframe assembly 16 and to the left pivot frame 18. Extension of the left wing folding cylinder 202 pivots the left wing 22 toward the transport position shown in FIG. 2. Retraction of the cylinder 202 pivots the left wing 22 toward the working position shown in FIG. 1. A right wing folding cylinder 204 is pivotally connected to the top plate 32 of the mainframe assembly 16 and to the right pivot frame 20. Extension of the right wing folding cylinder 204 pivots the right wing 24 toward the transport position shown in FIG. 2. Retraction of the right wing folding cylinder 204 pivots the right wing 24 toward the working position shown in FIG. 1.

The tool bar 10 is shown in FIG. 1 in a working position with the wings 12 and 14 extend laterally to the side of the telescopic tongue 26. However, the tool bar 10 is raised as shown in FIG. 1. Planting and earth working tools clamped to the tool mounting tubes 38, 64, 72, 76 and 84 would be lifted out of the contact with the ground. To start work, the tool bar 10 is lowered by retracting the hydraulic cylinders 130 and the hydraulic cylinder 174. As the cylinder 174 is retracted the extensions 206 and 208 on the rear ends of the upper draft links 148 and 152 pivot about pivot pin 150 and the slots 210 and 212 received the respective ends of a shaft 214. The shaft 214 is fixed to brackets 216 welded to the bottom of the rear tube 40 thereby locking the hitch member 168 to the tube 40 and the plates 32 and 34 of the main frame assembly 16.

The tool bar 10 is folded to a transport position by first extending the cylinders 130 and the cylinder 174. Extension of the cylinder 174 disengages the bar 214 from the slots 210 and 212 and raises the front end of the telescopic assembly 26. Extension of the cylinders 130 raises the tool mounting tubes 38, 64, 72, and 84 and lifts tools clamped to the tool mounting tubes from the ground. The left wing folding cylinder 202 and the right wing folding cylinder 204 are then extended to pivot the wing assemblies forward about the pivot bar 48 and the pivot bar 52. The telescopic tongue assembly 26 is not extended by movement of the tension links 186 and 188 toward positions parallel to the forward tube 42 and the rear tube 40. The hydraulic cylinders 258 retract thereby removing the lock pins 244 from the apertures 246 and 248 and allowing the tube portions 242 to telescope into the tube portions 242. When the wing assemblies 22 and 24 are parallel with the hitch assembly, and the hitch assembly 28 is telescoped to the desired length, the cylinders 258 are extended to move the lock pins 244 into apertures 270 in the tube portions 240 and fix the length of the tongue assembly 26. Extension of the forward tube 42 from the rear tube 40, after lock pins 244 are retracted from, permits an increase in the length of the tension connector links 186 and 188. Generally, a tractor attached to the hitch member 168 moves rearward to limit the load on the wing folding cylinders 202 and 204. As the left wing 22 and the right wing 24 approach a folded positions, with the left wing frame tube 78 and the right wing frame tube 86 parallel to the forward tube 42, wing support bars 220 on the left wing and bar 222 on the right wing move across the top of the rear tube 40. The cylinders 130 on the gauge wheel assemblies 100 attached to the left wing 22 and the right wing 24 are retracted to sit the bars 220 and 222 on the rear tube 40. The projection 224 on the free ends of wing supports 220 and 222, shown in FIG. 5, hold the bars and the wings 22 and 24 on the telescopic tongue assembly 26. The cylinder 174 is then fully extended to raise the forward end of the tongue assembly 26 and obtain maximum ground clearance.

The tool bar 10 is returned to an unfolded working position by reversing the above folding procedure.

We claim:

1. A tool bar with forward folding wings comprising:

a main frame assembly;

a telescopic tongue assembly including a rear tube secured to the main frame assembly, and a forward tube telescopically received in the rear tube;

a transverse horizontal tool mounting tube secured to the main frame assembly;

a left pivot frame assembly pivotally attached to the main frame assembly for pivotal movement about a left vertical axis and a right pivot frame assembly pivotally attached to the main frame assembly for pivotal movement about a right vertical axis;

a left wing assembly pivotally attached to the left pivot frame assembly for pivotal movement about a left fore and aft pivot axis and including a left tool mounting tube, and a left wing folding hydraulic cylinder pivotally connected to the main frame assembly and to the left pivot frame assembly and wherein the left wing folding hydraulic cylinder is operable to pivot the left pivot frame assembly and the left wing assembly about the left vertical axis between a left wing position extending laterally to the left side of the telescopic tongue and a left wing position extending forward from the left vertical axis and generally parallel with the telescopic tongue assembly;

a right wing assembly pivotally attached to the right pivot frame assembly for pivotal movement about a right fore and aft pivot axis and including a right tool mounting tube, and a right wing folding hydraulic cylinder pivotally connected to the main frame assembly and to the right pivot frame assembly and wherein the right wing folding hydraulic cylinder is operable to pivot the right pivot frame assembly and the right wing assembly about the right vertical axis between a right wing position extend laterally to the right side of the telescopic tongue and a right wing position extending forward from the right vertical axis and generally parallel with the telescopic tongue assembly;

at least two gauge wheels attached to and supporting the main frame assembly, at least one left gauge wheel attached to and supporting the left wing assembly and at least one right gauge wheel attached to and supporting the right wing assembly;

a hitch assembly including a mast fixed to a forward end of the forward tube of the telescopic tongue assembly, at least one draft link pivotally attached to the mast and to a hitch block, a parallel draft link pivotally attached to the mast and to the hitch block, parallel to the at least one draft link and cooperating with the mast, the at least one draft link and the hitch block to form a pantographic linkage, and a hydraulic cylinder attached to the mast and the at least one draft link and operable to lift and lower the mast between a raised transport position and a lowered working position;

a left tension connector including a rear tube pivotally connected to the left pivot frame assembly and the left wing assembly, a front tube telescopically attached to the rear tube and pivotally attached to the mast and a left lock to lock left tension member rear tube to the front tube when in a working position to minimize pivotal movement of the left pivot frame about the left vertical axis and to lock the left tension member rear tube to the front tube in a left tension member shortened transport position when the left wing assembly is in the left wing position extending forward from the left vertical axis;

a right tension connector including a rear tube pivotally connected to the right pivot frame assembly and the right wing assembly, a front tube telescopically attached to the rear tube and pivotally attached to the mast and a right lock to lock the right tension member rear tube to the front tube when in a working position to minimize pivotal movement of the right pivot frame about the right vertical axis and to lock the right tension member rear tube to the front tube in a right tension member shortened transport position when the right wing assembly is in the right wing position extending forward from the right vertical axis;

wherein the left lock and the right lock are unlocked to permit the left wing folding hydraulic cylinder and the right wing folding hydraulic cylinder pivot the left pivot frame assembly about the left vertical axis and pivot the right pivot frame assembly about the right vertical axis without moving the rear tube of the telescopic tongue assembly relative to the forward tube of the telescopic tongue assembly; and wherein the left lock and the right lock hold the forward tube and the rear tube of the telescopic tongue assembly in a tongue assembly transport length when the left lock locks the left tension member rear tube to the front tube in the left tension member shortened transport position, and the right lock locks the right tension member rear tube to the front tube in the right tension member shortened transport position.

2. A tool bar with forward folding wings, as set forth in claim 1, wherein the telescopic tongue assembly is increased in length to accommodate the length of the left wing assembly and the right wing assembly during folding of the left wing assembly and the right wing assembly from the working position to the tongue assembly transport length.

* * * * *